US009389698B2

(12) United States Patent
Bouwer et al.

(10) Patent No.: US 9,389,698 B2
(45) Date of Patent: Jul. 12, 2016

(54) REMOTE CONTROLLER FOR CONTROLLING MOBILE DEVICE

(71) Applicant: Analogix Semiconductor, Inc., Santa Clara, CA (US)

(72) Inventors: André Bouwer, San Jose, CA (US); Kewei Yang, Saratoga, CA (US); Marvin Su, Palo Alto, CA (US); Soumendra Mohanty, San Jose, CA (US)

(73) Assignee: Analogix Semiconductor, Inc., Santa Clara, CA (US)

( * ) Notice: Subject to any disclaimer, the term of this patent is extended or adjusted under 35 U.S.C. 154(b) by 0 days.

(21) Appl. No.: 14/734,950

(22) Filed: Jun. 9, 2015

(65) Prior Publication Data

US 2016/0162035 A1     Jun. 9, 2016

Related U.S. Application Data

(63) Continuation-in-part of application No. 14/624,521, filed on Feb. 17, 2015.

(60) Provisional application No. 62/087,706, filed on Dec. 4, 2014.

(51) Int. Cl.
*H04W 88/02*     (2009.01)
*G06F 3/01*     (2006.01)
(Continued)

(52) U.S. Cl.
CPC  *G06F 3/017* (2013.01); *G06F 3/02* (2013.01); *G06F 3/041* (2013.01); *G06F 3/04883* (2013.01); *G06F 3/04886* (2013.01); *G09G 5/003* (2013.01); *G09G 2370/16* (2013.01)

(58) Field of Classification Search
CPC ............ H04W 88/02; H04M 1/72527; H04M 1/7253; H04M 1/725; G06F 1/1632; G06F 3/017; G06F 3/02; G06F 3/041; G06F 3/04886; G06F 3/04883; G09G 5/003; G09G 2370/16

See application file for complete search history.

(56) References Cited

U.S. PATENT DOCUMENTS

2003/0094354 A1*  5/2003  Badarneh .............. G06F 3/0338
200/18

(Continued)

FOREIGN PATENT DOCUMENTS

| CN | 303454038 | 11/2015 |
| CN | 303542283 | 1/2016 |
| WO | DM088070 | 10/2015 |

OTHER PUBLICATIONS

Notice of Allowance dated Aug. 25, 2015 in Chinese Application No. 201530187861.0, filed Jun. 10, 2015.
(Continued)

*Primary Examiner* — Ted Wang
(74) *Attorney, Agent, or Firm* — Carr & Ferrell LLP (57) ABSTRACT

Provided is a remote control for controlling a mobile device. The remote control includes a communications transceiver configured to communicate with the mobile device and an actuator for receiving a user input while the remote control is communicatively coupled to the mobile device. The actuator comprises a touchpad including buttons for receiving the user input which can include a gesture including depressing the touchpad by a thumb; and concurrently moving the thumb across the touchpad. In response, the remote control may be operable to cause swiping a screen associated with a user interface of the mobile device; scrolling a portion of the screen; selecting and launching an application on the mobile device and controlling the functionality of the application; and/or selecting letters on a virtual keyboard provided by the user interface of the mobile device. The remote control is sized to comfortably fit in the user's palm for operation.

15 Claims, 6 Drawing Sheets

(51) Int. Cl.
*G06F 3/041* (2006.01)
*G09G 5/00* (2006.01)
*G06F 3/02* (2006.01)
*G06F 3/0488* (2013.01)

(56) References Cited

U.S. PATENT DOCUMENTS

| | | | |
|---|---|---|---|
| 2010/0057882 A1* | 3/2010 | Haartsen | H04L 67/16 709/218 |
| 2011/0312272 A1* | 12/2011 | Goto | G08C 17/02 455/41.1 |
| 2014/0104183 A1 | 4/2014 | Caron et al. | |
| 2014/0123253 A1 | 5/2014 | Davis et al. | |
| 2014/0184471 A1 | 7/2014 | Martynov et al. | |
| 2014/0217816 A1 | 8/2014 | Okada | |
| 2015/0029120 A1 | 1/2015 | Sieckmann | |
| 2015/0095786 A1* | 4/2015 | Kreiner | H04M 1/7253 715/734 |
| 2015/0187147 A1 | 7/2015 | Tieman | |
| 2015/0277744 A1* | 10/2015 | Tang | G06F 3/04883 715/863 |
| 2015/0326707 A1* | 11/2015 | Lee | H04W 12/08 455/420 |

OTHER PUBLICATIONS

Notice of Allowance dated Oct. 15, 2015 in Chinese Application No. 201530187611.7, tiled Jun. 10, 2015.
Non-Final Office Action, Sep. 24, 2015, U.S. Appl. No. 14/624,521, filed Feb. 17, 2015.

* cited by examiner

REMOTE CONTROLLER FOR CONTROLLING MOBILE DEVICE

CROSS-REFERENCE TO RELATED APPLICATIONS

The present application is a Continuation-In-Part of U.S. patent application Ser. No. 14/624,521, filed Feb. 17, 2015, which claims the benefit of U.S. Provisional Application No. 62/087,706, filed Dec. 4, 2014. The present application is related to U.S. patent application Ser. No. 13/761,013, (now issued as U.S. Pat. No. 9,084,106), filed Feb. 6, 2013, and is also related to U.S. patent application Ser. No. 14/525,124, filed Oct. 27, 2014. The subject matter of the aforementioned applications is incorporated herein by reference for all purposes.

FIELD

The present application relates to remote controls, and more specifically to a remote control unit for providing various functionality related to a mobile device.

BACKGROUND

Approaches described in this section should not be assumed to qualify as prior art merely by virtue of their inclusion therein.

Mobile devices are becoming increasingly popular due to their flexibility and ready access to rich content. A mobile device (which may be a mobile phone, a smart phone, a phablet, a tablet, a convertible notebook, an ultrathin notebook, and the like) can be coupled to a charging dock which can receive power (e.g., via a wall outlet) and provide it to the mobile device. For transmitting video data, the mobile device can be physically coupled to a video receiver. Tethering the mobile device thusly can constrain control of the mobile device by a user situated some distance away from the mobile device.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

According to one embodiment of the disclosure, a console unit is provided for controlling a mobile device. According to various example embodiments, the console unit comprises a remote control unit and a tower section. The remote control unit can include a communications transceiver configured to communicate with the mobile device. The tower section can include a receptacle adapted for receiving the remote control unit at least partially therein. The tower section can further include a housing and at least one of the following: an interface configured for coupling to the mobile device, at least one media port for providing high definition media data to at least one media player device, and a power port for coupling the tower section to a power source for receiving power to charge the mobile device. The interface can be configured to selectively receive high definition media data and USB (Universal Serial Bus) protocol data from the mobile device. In some embodiments, the interface is further configured for charging the mobile device.

In some embodiments, the interface includes a cable. The cable can include one end coupled to the tower section. The cable can further include another end having a USB protocol connector for coupling to the mobile device. In some embodiments, the tower section includes two media ports. The two media ports may include: at least one HDMI (High-Definition Multimedia Interface) port configured for coupling to an HDMI compatible device; and at least one USB port configured for coupling to a USB compatible device. In some embodiments, at least one of the power port, the media port(s), and the interface includes at least one of an HDMI connector, a DisplayPort connector, and a USB connector. The USB connector may be a USB Type C, micro-USB and other USB type and/or variant.

In some embodiments, the tower station is configured to charge the remote control unit that is disposed at least partially in the receptacle. In certain embodiments, the remote control unit is charged using wireless charging. While the mobile device is coupled to the tower section, the at least one media player may be configured to provide video of a screen of the mobile device (e.g., mirroring).

According to various embodiments, a remote control unit is provided which is configured to communicate with the mobile device via one or multiple of various wireless protocols, including Bluetooth, near field communication (NFC), and WiFi to name a few. As referred to herein, the Bluetooth wireless protocol in exemplary embodiments includes all variants of Bluetooth, including Bluetooth Low Energy (BLE) (also referred to as Bluetooth Smart). In various embodiments, the remote control unit includes an actuator, including a touchpad for receiving an input from a user. In operation, the input may be received while the mobile device is communicatively coupled to the remote control unit and also coupled to the tower section. The touchpad may also include functionality for a plurality of buttons. In certain embodiments, the remote control unit further includes additional buttons that are separate from the touchpad for receiving input from a user, e.g., buttons for inputs to raise the volume, lower the volume, control the shutter of a camera for taking a photograph, to name a few. The mobile device can be configured to perform an action associated with the received input. In other embodiments, the remote control unit may be a game controller.

In some embodiments, buttons are provided on the touchpad. In certain embodiments, the touchpad includes touch-sensitive areas for the buttons, the touch-sensitive areas being associated with each of three standard Android buttons.

In some embodiments, the input from a user is a gesture. For example, the input gesture is received by depressing (e.g., pushing down) the surface of the touchpad by one of the five digits of a hand (i.e., a thumb or one of the other four fingers), and then moving the digit (also referred to herein as a finger, which may be a thumb) across the touchpad while keeping the touchpad depressed. In some embodiments, the action to be caused in response to the gesture includes one or more of the following: swiping a screen associated with a user interface of the mobile device; scrolling a portion of a screen associated with the user interface of the mobile device; selecting and launching an application on the mobile device and controlling the functionality of the application; and typing a letter on a virtual keyboard provided by the user interface of the mobile device.

According to another example embodiment of the present disclosure, the steps of the method can be stored on a non-transitory machine-readable medium comprising instructions, which when implemented by one or more processors perform the recited steps.

Other example embodiments of the disclosure and aspects will become apparent from the following description taken in conjunction with the following drawings.

BRIEF DESCRIPTION OF THE DRAWINGS

Embodiments are illustrated by way of example and not limitation in the figures of the accompanying drawings, in which like references indicate similar elements.

DETAILED DESCRIPTION

The following detailed description includes references to the accompanying drawings, which form a part of the detailed description. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical and electrical changes can be made without departing from the scope of what is claimed. The following detailed description is, therefore, not to be taken in a limiting sense, and the scope is defined by the appended claims and their equivalents.

The technologies disclosed herein provide systems and methods for remote controlling mobile devices via a remote controller utilizing a docking station (also referred to variously herein as a charging station, a charging dock, a charging tower, a docking tower, a dock tower, dock, a tower dock, tower section, and a tower). A remote (which may also be referred to as a remote control, a remote controller, a mobile device remote controller, and a smart phone remote controller) may enable a user to control the mobile device. The docking station can facilitate video display provided by a mobile device to a display device, for example, a television set. In various embodiments, the docking station includes a conversion processor and a remote controller for controlling the mobile device. The docking station can include a receptacle to receive the remote controller and may recharge the remote controller wirelessly or through transmission of power from electrical contacts of the receptacle to electrical contacts of the remote. The remote controller can communicate with the mobile device via Bluetooth, WiFi, or any other suitable communication protocol. In various embodiments, the remote control is locatable at, and removable from, the tower dock, and communicates with the mobile device.

The docking station can provide media data comprising, for example, video and/or audio data, to a media player while the mobile device is plugged into the dock. The media player may be, for example, a high definition TV (HD TV) or ultra-high definition TV (UHD TV, including but not limited to 4K UHD (2160p) and 8K UHD (4320p)).

A mobile device remote controller as described herein can be operable to extend the reach of a smart phone. A smart phone remote controller may control applications running on the smart phone, such as navigating menus and/or controlling video stream playback on the smart phone and/or a media player (e.g., a television or monitor). The mobile device remote controller can be particularly useful when, for example, a mobile phone is not easily reachable, such as during charging and/or while being connected to a media player via a docking station. In some embodiments, the remote controller is connected to the smart phone through various wireless technology (e.g., WiFi, Bluetooth or any other suitable communication protocol), and may have very low power consumption, such that the remote controller does not require charging or battery replacement for many months. In further embodiments, the smart phone remote controller can be operable to receive incoming phone calls and/or place outgoing phone calls, and to issue voice commands to the operating system or an application on the mobile device.

According to an example embodiment, a console unit is provided. The console unit can include a remote control unit and a tower section including a receptacle adapted for receiving the remote control unit at least partially therein. The remote control unit can include a communications transceiver configured to communicate with the mobile device. The tower section can further include a housing and at least one of: an interface, at least one media port, and a power port. The interface can be configured for coupling to the mobile device and for selectively receiving high definition media data and USB protocol data from the mobile device. The interface can be further configured for charging the mobile device. The at least one media port can be configured for providing the high definition media data to at least one media player device. The power port can be configured for coupling to a power source for receiving power.

Figure 1:
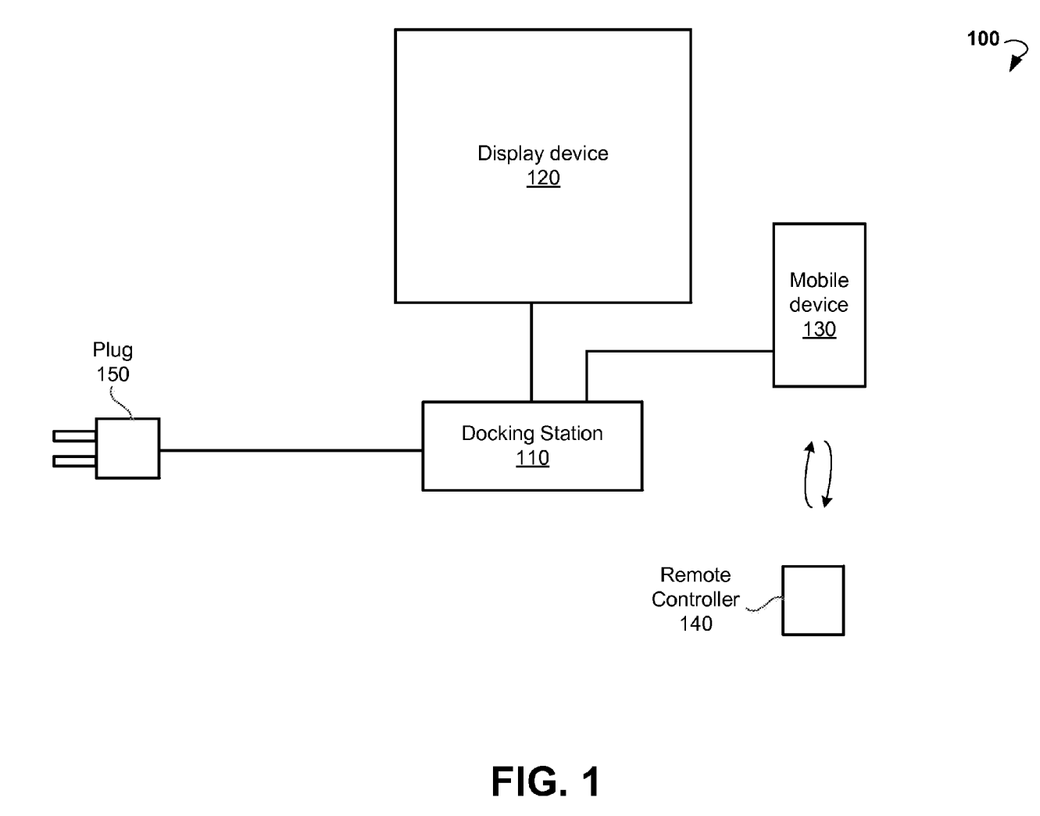
FIG. 1 is a block diagram of an example system for controlling a mobile device via a remote controller utilizing a charging dock, according to an example embodiment.

FIG. 1 is block diagram illustrating a system 100 for remote controlling a mobile device, according to various embodiments of the present technology. In this example, system 100 includes a mobile device 130 coupled to a docking station 110 via a cable. Mobile device 130 can be configured to receive power from docking station 110 for recharging the battery (or batteries) of mobile device 130.

In various embodiments, mobile device 130 provides media data to docking station 110 and can be controlled by remote controller 140. In some embodiments, the media data are provided by docking station 110 to a media player, for example, a display device 120. In various embodiments, docking station 110 is configured to receive power for converting data and for charging mobile device 130 via plug 150, which is insertable into a wall socket or other suitable power source (e.g., a power source in an automobile, a USB charging battery, and the like). The remote controller 140 can communicate wirelessly to control a mobile device 130 coupled to the docking station 110. In some embodiments, the remote controller 140 is operable to control any device using a Bluetooth mouse/trackpad HID (human interface device) protocol.

Figure 2:
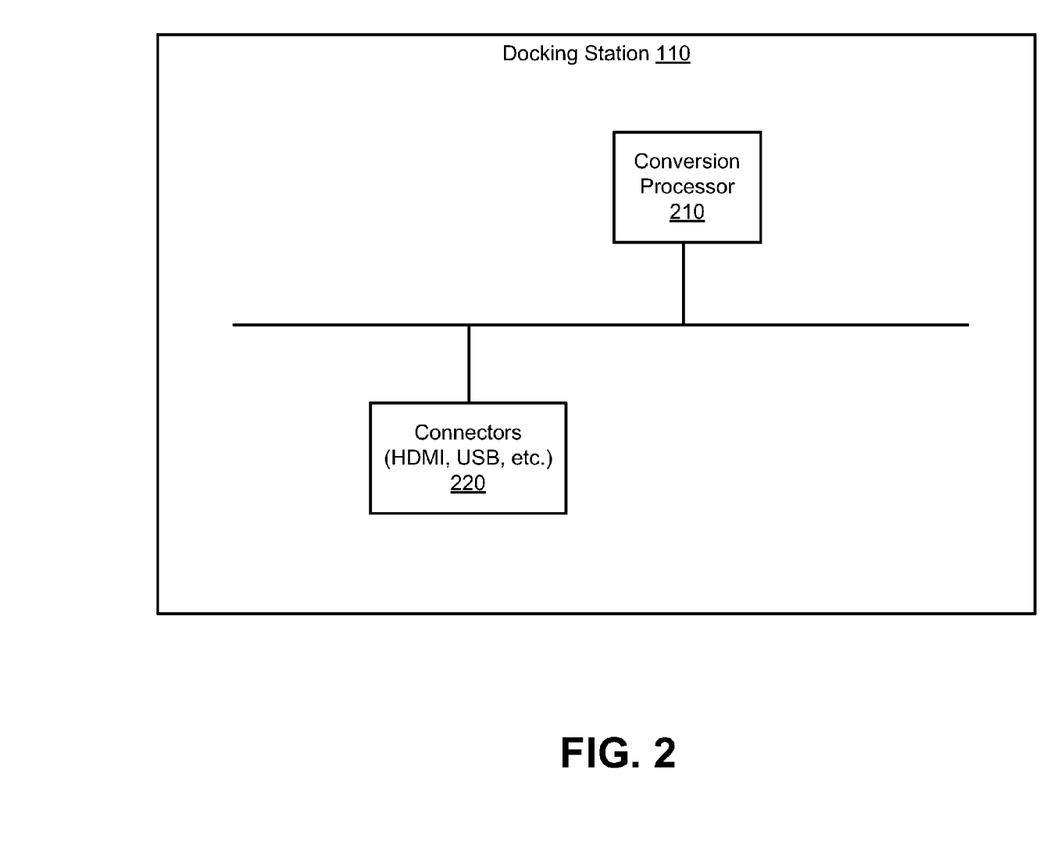
FIG. 2 is a block diagram of an example docking station.

FIG. 2 is a block diagram showing components of a docking station 110, according to various example embodiments. The docking station 110 can include a conversion processor 210 and connectors 220.

Figure 3:
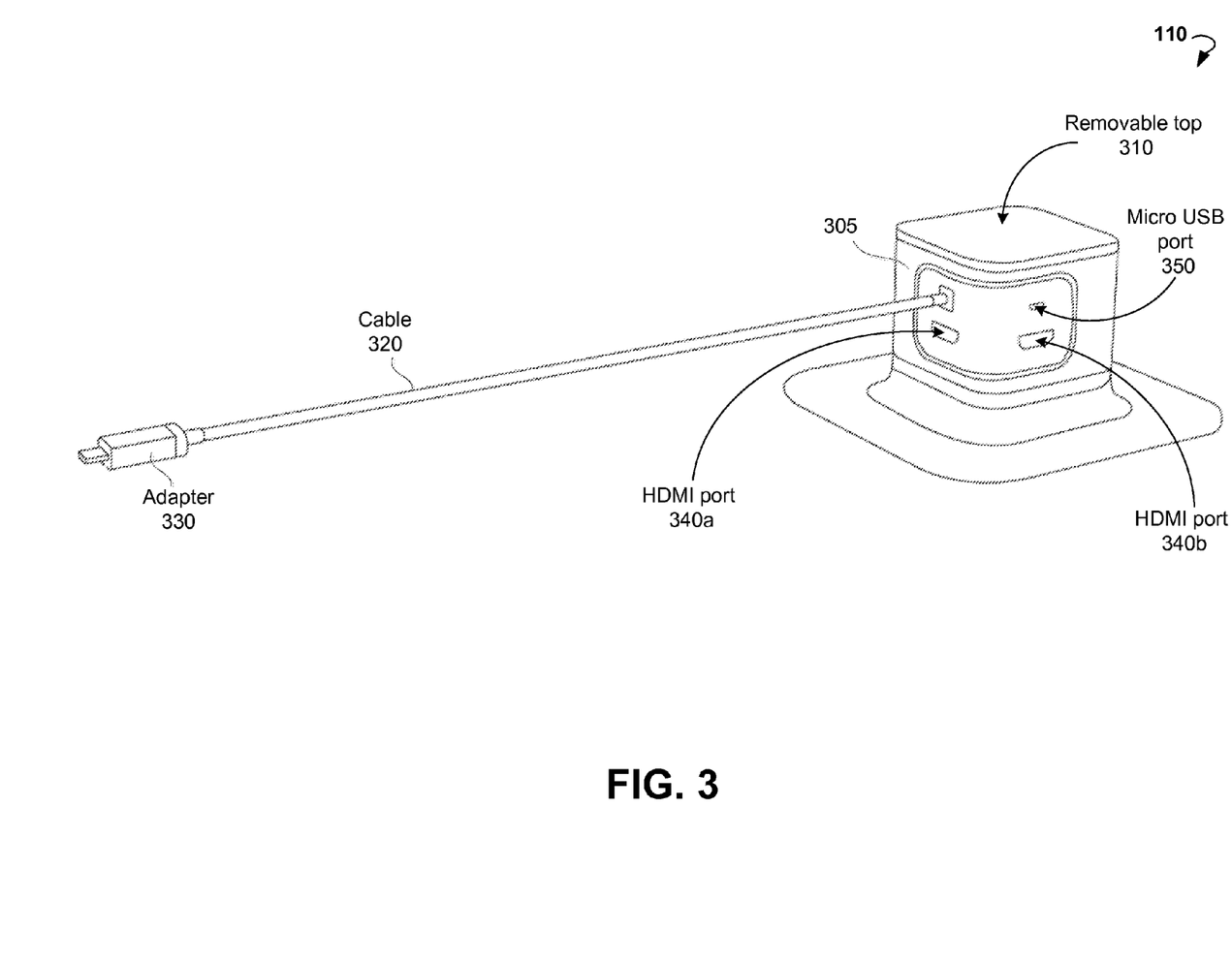
FIG. 3 is a block diagram illustrating a docking station, according to an example embodiment.

FIG. 3 is a block diagram showing an example docking station 110, according to various example embodiments. The example docking station 110 includes a housing 305, a removable top 310 (e.g., a removable remote control), a cable 320, an adapter 330, HDMI ports 340a and 340b, and a micro USB port 350. In various embodiments, the housing 305 of the docking station 110 includes a base and a recess on top of the base (for example, underneath the removable top 310), the recess being configured to receive the remote controller 140, e.g., when the remote controller 140 is not being held by a user. In various embodiments, the docking station 110 receives data (e.g., video data, audio data, or other appropriate media data or computer data) via a USB connector (or via any other appropriate device connector) from the mobile device 130 and provides the data to a media player, via an HDMI connector (or any other appropriate device connector, for example, a USB connector). It should be noted that the data as referred to herein may include video data only, both video and audio data, audio/video data being commonly referred to as just video data for short, or computer data typically communicated via USB.

In some embodiments, the conversion processor 210 in the docking station 110 is operable to be powered directly from a wall outlet. In certain embodiments, the docking station 110 includes multiple connectors (for example, two HDMI connectors, two USB connectors) for communicating variously with one or more display devices, or other devices (for example, a Chromecast player, and a Blu-Ray player).

Different connectors 220 are possible for different components of the docking station, as well as for different functionalities. In some embodiments, a DisplayPort connector or an HDMI connector, to name just a few, is used for video outputs from the docking station, and a micro-USB or other suitable USB connector may be used for video inputs to and/or video outputs from the docking station.

In some embodiments, multiple USB connections with the docking station can be made, for example, one to the mobile device 130 and one to the display device 120 or other media player, to name just a few.

The docking station 110 may operate using a DisplayPort standard and/or MyDP standard, as a digital audio-video interface as well as a USB 2.0 data interface connectivity between a transmitter (source) device and a receiver (sink) device using a standard 5-pin connector and a protocol. An enhanced protocol may be used, such enhanced protocol can be referred to as Slimport or Slimport Pro, both extensions of DisplayPort. In example embodiments, the transmitter (source) device is the mobile device (e.g., 130 in FIG. 1) coupled via cable 320 to the housing 305 of the docking station 110 (e.g., also referred to herein as a console unit when the remote controller 140 is included instead of, or in addition to, the removable top 310).

The cable 320 may include the adapter 330 configured for providing the operability of the protocol, e.g., the enhanced protocol. Further description of an exemplary cable is found in U.S. patent application Ser. No. 14/525,124, filed Oct. 27, 2014, which is incorporated by reference herein. In some embodiments, the enhanced protocol functionality provided by the adapter 330 and cable 320, may be provided instead within the dock station housing.

Figure 4:
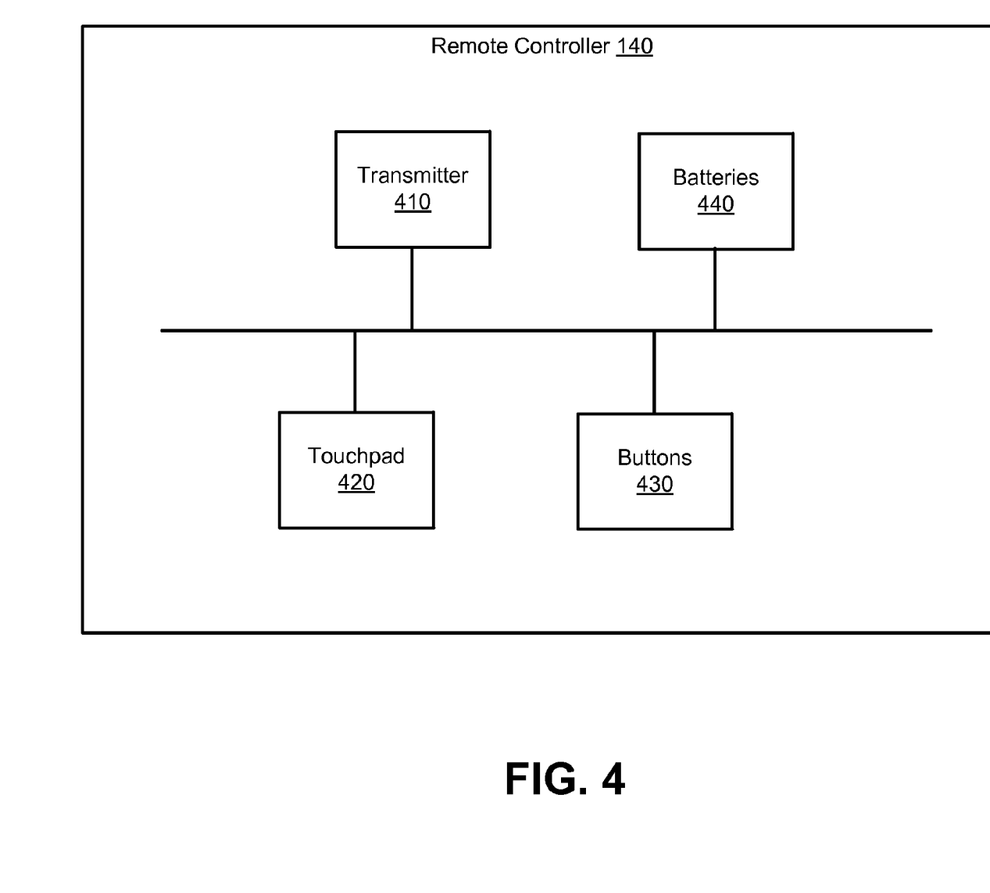
FIG. 4 is a block diagram of an example remote controller.

FIG. 4 is a block diagram showing the architecture of a remote controller 140, according to various example embodiments. The remote controller 140 can include a transmitter 410, a touchpad 420 (including various associated buttons), other buttons 430, and batteries 440. The transmitter 410 can be configured to communicate wirelessly with the mobile device 130 via Bluetooth (including Bluetooth Low Energy, (also known as Bluetooth Smart) and other Bluetooth protocols), WiFi, or any other suitable communication protocol.

In one example embodiment, the remote controller 140 is configured to allow a user to control a mobile device's user interface. The mobile device 130 may be connected to a docking station 110, such that, using the remote controller 140, the user can perform actions on the mobile device screen or the video displayed on a big screen by the mobile device 130 via docking station 110.

In some embodiments, various "buttons" on the remote controller 140 are accessible while the remote controller 140 is positioned on or in the receptacle (e.g., in the recess) at the top of the docking station 110. In particular, the remote controller 140 can be accessible by a user when the remote controller 140 is positioned, at least partially, on or in the receptacle of the docking station 110 and allows the user to access the touchpad 420 (including various associated buttons) and other buttons 430 in this position. The remote controller 140 can receive these inputs and controls of the mobile device 130 while being positioned, at least partially, on or in the receptacle of the docking station 110.

In various embodiments, the shape of the remote controller 140 is designed to blend into the shape of docking station 110 to create an integrated appearance when the remote controller 140 is disposed, at least partially, on or in the receptacle of the docking station 110. In some embodiments, the touchpad 420 (including various associated buttons) and other buttons 430 are operable to receive user input. An example arrangement of the buttons associated with the touchpad 420 can include three buttons associated with the Android operating system (Home, Back, and Recent Applications launcher). The user interface using the touchpad 420 may include various advantageous configurations.

Figure 5A:
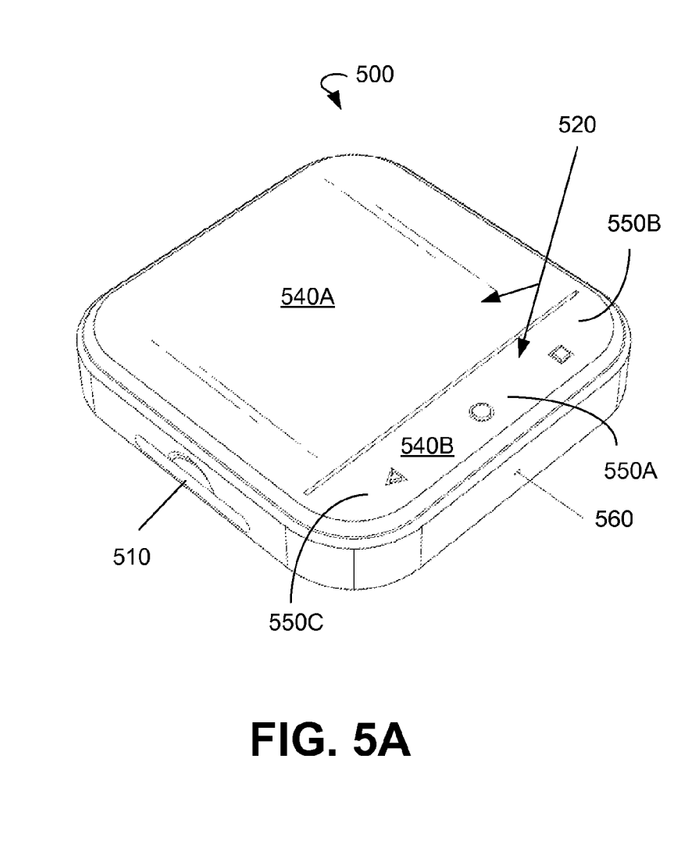
FIG. 5A is a block diagram showing an example shape of a remote controller, according to an example embodiment.
Figure 5B:
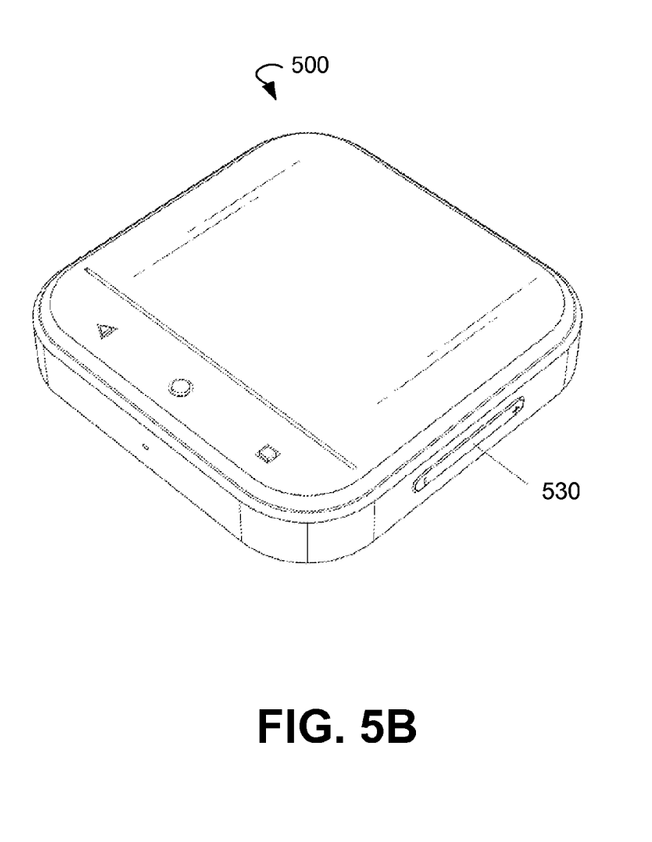
FIG. 5B is another view of the remote controller of FIG. 5A, according to an example embodiment.

FIGS. 5A and 5B are diagrams illustrating example shapes and aspects of a remote control 500 according to various embodiments. Remote control 500 (also referred to variously herein as remote controller 500 and remote control unit 500) is an embodiment of remote controller 140. In some embodiments, the remote control 500 includes a touchpad 520. The touchpad 520 includes a first portion 540A (e.g., a trackpad portion) and a second portion 540B. The second portion 540B of the touchpad 520 provides for remote activation by a user of the primary Android buttons (Home, Back, and Recent Applications launcher) of the mobile device 130. In some embodiments, these primary Android buttons of the mobile device 130 are activated via three specific touch-sensitive areas 550A, 550B, and 550C located on the second portion 540B of the touchpad 520 as shown in FIG. 5A. The three touch-sensitive areas 550A, 550B, and 550C may correspond to the three primary Android buttons. (See exemplary button icons shown in FIGS. 5A and 5B). The user may activate each of the three buttons on the second portion 540B of the touchpad 520 by depressing a respective one of the touch-sensitive areas 550A, 550B, and 550C, so as to cause actuation of a micro-switch located underneath the surface of the second portion 540E of the touchpad 520 of the remote control 500.

In some embodiments, in order to perform an action on the mobile device 130 remotely, the user can first click on the first portion 540A of the touchpad 520, for instance, by depressing with a thumb the first portion 540A of the touchpad 520, so as to cause actuation of the micro-switch located underneath the surface of the first portion 540A of the touchpad 520. Thereafter, while the user's thumb is still on the first portion 540A of the touchpad 520 and the touchpad's "click" is still actuated, the user can move the thumb across the first portion 540A of the touchpad 520 to perform an action on the mobile device 130. After completing the action, the user may remove the thumb from the first portion 540A of the touchpad 520 to disengage the micro-switch.

In some embodiments, the action includes a "swipe" action for swiping to other screens of the mobile device's user interface, for example, for swiping screens, images, and user interface panels left, right, up, and down.

In some embodiments, by utilizing the remote control 500, the user of the mobile device 130 can perform a scrolling action to scroll a portion of user interface of the mobile device 130 in a situation when the scrolling functionality is available. The scrolling action can include scrolling up, down, left or right an information text, a webpage, an image, and so on.

In some embodiments, by utilizing the remote control 500, the user of the mobile device 130 can select and launch an application on the mobile device 130 and control the functionality of the application.

In some embodiments, by using the first portion 540A of the touchpad 520 and the touchpad's "click" (caused by depressing a micro-switch beneath the surface of the touchpad 520), a user of the mobile device 130 can type letters using a virtual keyboard in the mobile device's user interface, i.e., when the virtual keyboard is available.

In various embodiments, the remote control 500 is sized to be small enough to comfortably fit in a user's hand. For example, the remote control 500 can sit in the palm of the user's hand, allowing the user to perform actions and gestures on the touchpad 520 using the thumb of the same hand. In one example embodiment, the remote control 500 can be about a 45 mm square with a depth of about 10.5 mm. In another example embodiment, the remote control 500 can be about a 2.5 inches square with a depth of about ⅝ inches. In various embodiments, the remote control 500 is made of a soft-rubber material, or other materials with similar properties and texture. In other embodiments, the touchpad 520 is a smooth surface that facilitates performance of actions and gestures by the user. Other suitable sizes, shapes, and materials may be used in other embodiments of the remote control 500, with the remote control 500 comfortably-sized to fit in the palm of the user and the texture of the remote control 500 comfortable to the user while facilitating the use of the touchpad 520.

In an example embodiment, two coin batteries may be used with a battery tray 510 that slides out, optionally, in response to a pin or paper clip being inserted into an adjacent hole or in response to a finger causing the battery tray 510 to slide out, in order to provide battery power to the remote control 500. In various embodiments, the batteries are arranged within the remote control 500 to balance the weight distribution of the remote control 500 while in the user's hand, so as to facilitate performance of actions and gestures on the touchpad 520 or the rocker button 530 of the remote control 500. In some embodiments, the remote control 500 also includes an element 560, which may variously function to visually indicate (e.g., an LED light or the like that is actuated to indicate the remote control 500 is transmitting data) on the remote control 500 that a button press, gesture, etc., was performed by the user or that Bluetooth pairing mode is active, a low-power condition state, or the remote control 500 has been awaken from sleep mode, for example. The element 560 of remote control 500 may also provide for facilitating communicating data from the remote control 500. In other embodiments, the rocker button 530 can be used to control the shutter of a camera for taking a photograph on a mobile device 130.

Figure 6:
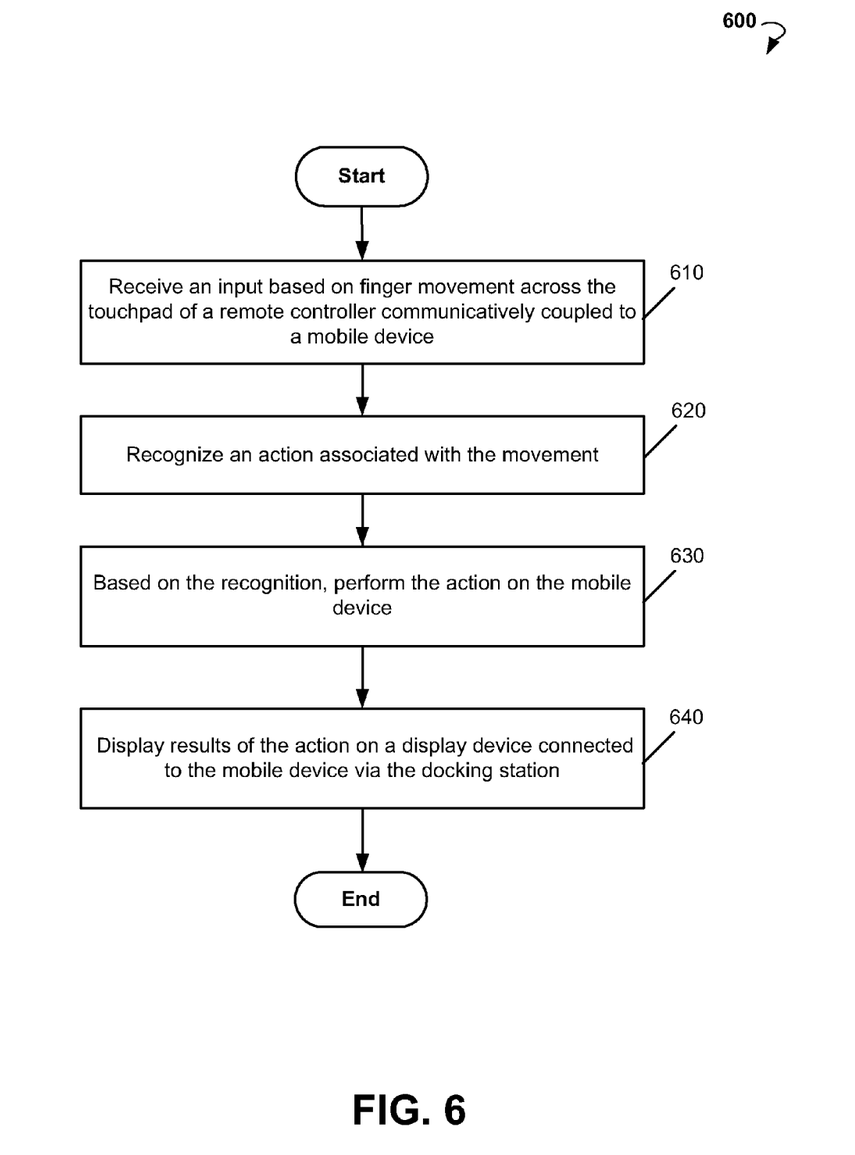
FIG. 6 is a flowchart showing steps of method for controlling a mobile device via a remote controller utilizing a charging dock, according to an example embodiment.

FIG. 6 is a flowchart showing steps of a method 600 for remote controlling a mobile device. The method can be performed using remote controller 140, mobile device 130, docking station 110, and display device 120. In block 610, the method 600 receives an input as a user depresses the touchpad of a remote controller with a finger and moves the finger across the touchpad. The remote controller can be communicatively coupled to a mobile device 130. The mobile device can be connected to the docking station. In block 620, method 600 proceeds to recognize an action associated with the movement. In block 630, method 600 proceeds to perform the action on the mobile device. In block 640, the method 600 displays results of the action on the display device. The display device can be connected to the mobile device via a docking station. The display device can be configured to display a screen of the mobile device.

While this technology is susceptible of embodiment in many different forms, there is shown in the drawings and will herein be described in detail several specific embodiments with the understanding that the present disclosure is to be considered as an exemplification of the principles of the technology and is not intended to limit the technology to the embodiments illustrated.

What is claimed is:

1. A remote control unit for controlling a mobile device, the remote control unit comprising:
 a communications transceiver configured to communicate with the mobile device; and
 at least one actuator for receiving an input from a user while the remote control unit is communicatively coupled to the mobile device, the at least one actuator comprising a touchpad, the touchpad including:
  one or more buttons for receiving the input from the user; and
  a first portion, the first portion of the touchpad comprising at least one micro-switch being actuated in response to the user input received, the user input comprising a gesture, the gesture including:
   depressing the first portion of the touchpad by one of five digits of a hand; and
   moving the digit across the first portion of the touchpad while keeping the first portion of the touchpad depressed, the depressing and moving operable to cause, at least in part, swiping at least one screen associated with a user interface of the mobile device.

2. The remote control unit of claim 1, wherein in response to receiving, at the first portion of the touchpad, the depressing and moving, the remote control unit is operable to cause, at least in part, one or more of the following:
 scrolling a portion of the at least one screen associated with the user interface of the mobile device;
 selecting and launching an application on the mobile device and controlling functionality of the application; and
 selecting letters on a virtual keyboard provided by the user interface of the mobile device.

3. The remote control unit of claim 1, wherein in response to receiving, at the first portion of the touchpad, the depressing and moving, the remote control unit is operable to cause, at least in part, scrolling a portion of the at least one screen associated with the user interface of the mobile device.

4. The remote control unit of claim 1, wherein the remote control unit is configured and operable such that the input received from the user is provided by the user using a thumb while holding the remote control unit in the palm of the same hand.

5. The remote control unit of claim 1, wherein the touchpad includes a second portion, the second portion of the touchpad comprises at least one micro-switch being actuated in response to the user input received, the input received being a depressing at the second portion of the touchpad.

6. The remote control unit of claim 5, wherein the depressing of the second portion of the touchpad causes execution of at least one Android function.

7. The remote control unit of claim 1, further including at least one additional button, the at least one additional button comprises a rocker button for providing at least one of volume control and camera shutter control.

8. The remote control unit of claim 1, wherein the remote control unit is operable as a game controller.

9. A method for controlling a mobile device using a remote control unit, the method comprising:
- communicating, via a communications transceiver, with the mobile device; and
- receiving, via at least one actuator, input from a user while the remote control unit is communicatively coupled to the mobile device, the at least one actuator comprising a touchpad, the touchpad including:
  - one or more buttons for receiving the input from the user; and
  - a first portion, the first portion of the touchpad comprising at least one micro-switch being actuated in response to the user input received, the user input comprising a gesture, the gesture including:
    - depressing the first portion of the touchpad by one of five digits of a hand; and
    - moving the digit across the first portion of the touchpad while keeping the first portion of the touchpad depressed, the depressing and moving operable to cause, at least in part, swiping at least one screen associated with a user interface of the mobile device.

10. The method of claim 9, wherein in response to receiving, at the first portion of the touchpad, the depressing and moving, causing, at least in part, one or more of the following:
- scrolling a portion of the at least one screen associated with the user interface of the mobile device;
- selecting and launching an application on the mobile device and controlling functionality of the application; and
- selecting letters on a virtual keyboard provided by the user interface of the mobile device.

11. The method of claim 9, wherein the input received from the user includes is provided by the user using a thumb while holding the remote control unit in the palm of the same hand.

12. The method of claim 9, wherein the touchpad includes a second portion, the second portion of the touchpad comprises at least one micro-switch being actuated in response to the user input received, the input received being a depressing at the second portion of the touchpad.

13. The method of claim 12, wherein the depressing of the second portion of the touchpad causes execution of at least one Android function.

14. The method of claim 9, further including at least one additional button, the at least one additional button comprises a rocker button for providing at least one of volume control and camera shutter control.

15. A non-transitory processor-readable medium having embodied thereon a program being executable by at least one processor to perform a method for controlling a mobile device using a remote control unit, the method comprising:
- communicating, via a communications transceiver, with the mobile device; and
- receiving, via at least one actuator, input from a user while the remote control unit is communicatively coupled to the mobile device, the at least one actuator comprising a touchpad, the touchpad including:
  - one or more buttons for receiving the input from the user; and
  - a first portion, the first portion of the touchpad comprising at least one micro-switch being actuated in response to the user input received, the user input comprising a gesture, the gesture including:
    - depressing the first portion of the touchpad by one of five digits of a hand; and
    - moving the digit across the first portion of the touchpad while keeping the first portion of the touchpad depressed, the depressing and moving operable to cause, at least in part, swiping at least one screen associated with a user interface of the mobile device.

* * * * *